Figure 1:
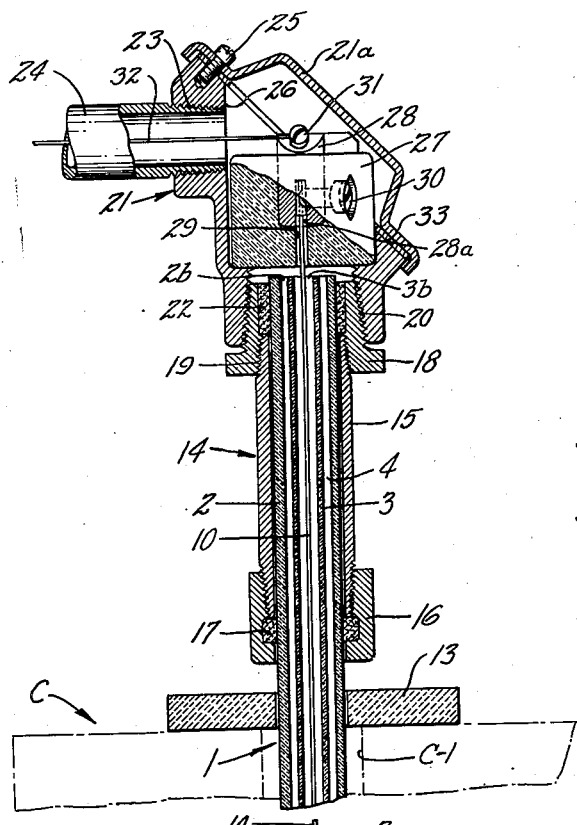

Dec. 30, 1952  A. K. LYLE  2,623,969
ELECTRODE FOR CONTACT WITH MOLTEN GLASS
Filed July 18, 1950

INVENTOR
AARON K. LYLE
BY Parham + Bates
ATTORNEYS

Patented Dec. 30, 1952

2,623,969

UNITED STATES PATENT OFFICE 2,623,969

ELECTRODE FOR CONTACT WITH MOLTEN GLASS

Aaron K. Lyle, West Hartford, Conn., assignor to Emhart Manufacturing Company, a corporation of Delaware Application July 18, 1950, Serial No. 174,507

5 Claims. (Cl. 200—152)

This invention relates generally to improvements in electrodes for contact with molten glass and more particularly to an improved electrode for use in a molten glass level gauging or indicating device such, for example, as that which is disclosed in U. S. Patent No. 2,483,333 to Cannon, Jr., et al.

The electrode customarily used in a glass level gauging or indicating device of the kind referred to has an elongate body comprising concentric inner and outer refractory tubes joined together by refractory cement and provided at one end with an electrically conductive tip in the form of a small hollow pointed thimble of thin gauge platinum or other suitable metal filled with refractory cement and firmly fixed to the refractory tube by refractory cement. An electrically conductive wire attached to this thimble extends through the electrode body for connection with suitable means to complete an electric circuit through the molten glass when the electrode is operatively supported with its conductive tip lowermost and in contact with the surface of the molten glass.

The electrode just described is relatively costly to manufacture. After the opposite ends of the component refractory tubes have been cemented together and the metal contact tip and connecting wire have been cemented to the refractory tubes, the assembly must be laid aside until the cement is thoroughly dry and then baked. The assembly operation, cement drying and baking require several days.

Repair of one of these electrodes if required also is costly and ordinarily cannot be accomplished in the field. Thus, to repair such an electrode, the first step ordinarily is to return it to the producing factory. There the cement must be dug out of the hollow contact thimble which must be reshaped before it can be used again as an electrode tip. Cement also must be removed from the connecting wire. The salvaged wire and contact tip, if disconnected, may then be welded together again and the repair work may proceed as in the case of the original manufacture, replacement of course being made of any refractory tube that has been broken or otherwise rendered unfit for use.

An object of the present invention is substantially to reduce the cost of manufacture and of repair of an electrode suitable for the purposes for which the relatively expensive electrode described has been used.

A further object of the invention is to simplify the construction of such an electrode by providing cooperative component elements thereof which can be quickly and easily assembled and retained in place without the use of cement and so that they can be readily separated and individual parts removed and replaced when required.

The novel electrode provided by the invention can be manufactured at less than half the cost of the prior electrode and assembly of the parts thereof and hence repair can be made at the place of use. Manufacturing and repair costs thus will be greatly reduced.

Figure 2:
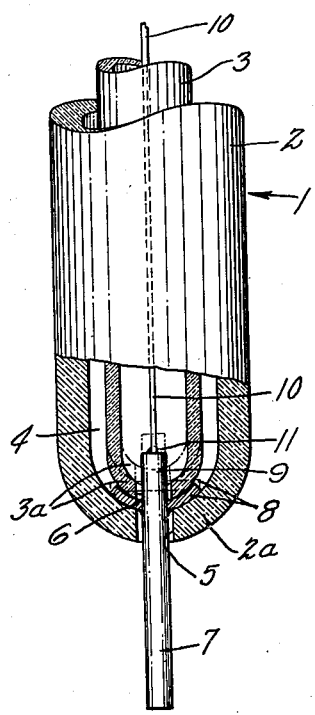
Figure 2:
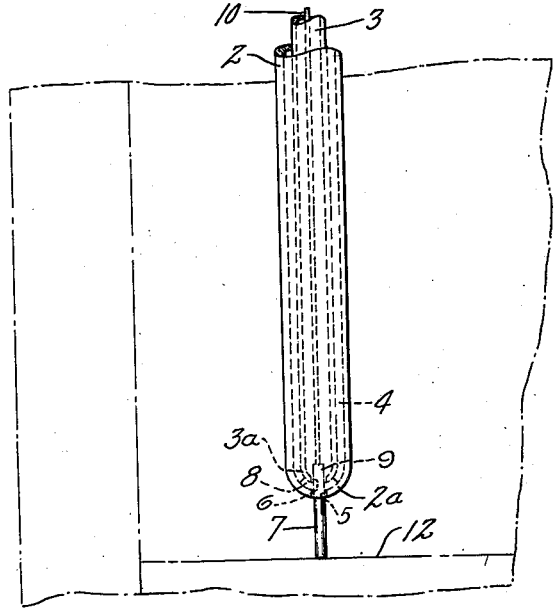

Other objects and advantages hereinafter will be pointed out or will be obvious from the following description of an electrode embodying the invention, as shown in the accompanying drawings, in which:

Figure 1 is a fragmentary view, mainly in vertical section and partly in elevation, showing the electrode positioned with its tip in contact with the surface of a body of molten glass in a containing structure, the molten glass being indicated diagrammatically; and Fig. 2 is a relatively enlarged fragmentary view showing the extreme lower end portion of the novel electrode in vertical section and the portion immediately thereabove in elevation.

The novel electrode of the invention has an elongate body generally designated 1 comprising an outer refractory tube 2 and an inner refractory tube 3 sufficiently smaller diametrically than the outer tube to fit in the latter with a moderate clearance space therebetween as indicated at 4. The outer tube 2 has a rounded or spherical lower end 2a provided with an axial opening therein at 5. The inner tube 3 likewise has a rounded or spherical lower end, indicated at 3a, provided with an axial opening 6 which may be like opening 5. The refractory tubes 2 and 3 preferably are porcelain. They may be open at their upper ends as indicated at 2b and 3b, respectively, Fig. 1.

An electrically conductive tip for the lower end of the electrode body comprises a straight rodlike contact element 7 provided at one end with a head comprising a flange 8 integral therewith or fixed thereto in any suitable known way. The element 7 is sufficiently smaller in diameter than the opening 5 in refractory tube end 2a to extend downwardly through such opening with some clearance when flange 8, which is larger in diameter than the opening 5, is clamped in place in the bottom end of tube 2 by the bottom end of inner tube 3 as shown in the drawings. The head portion of the electrode tip may include a relatively short rod-like element 9 on the flange 8 above and in line with the longer contact element 7 so as to be in effect an upward extension thereof. Element 9 is integral with flange 8 and rod 7 and is smaller than opening 6 in bottom end of clamping inner tube 3 so as to project upwardly through opening 6 as shown. Element 9 may serve as an attaching post for a wire 10 which is secured thereto as by welding, as indicated at 11, Fig. 2. The wire 10 is of sufficient length to extend upwardly through inner tube 3 beyond the upper end thereof for a purpose presently to be stated. Element 9 may also cooperate with wall of opening 6 to guide the electrode tip to the desired position on the bottom end of tube 3 when the parts of the electrode as described so far are assembled. Assembly of these parts will now be explained.

The wire 10 may be passed through inner tube 3 and manually held under sufficient tension to maintain the flange 8 against the bottom end of the tube 3. Inner tube 3 with the electrode tip thus held against its bottom end then may be lowered as a unit into the outer refractory tube 2 to the bottom of the latter, the element 7 of the electrode tip passing downwardly through the opening 5 so as to project below the lower end of outer tube 2. The flange 8 may be flat when applied as indicated by the dotted line position thereof in Fig. 2. However, the flange 8 may be sufficiently thin that the weight of the inner refractory tube 3 thereon will press it down until it conforms to the contour of the inner surface of the lower end 2a of the outer tube 2 as shown in full lines in Fig. 2 and in Fig. 1. It is preferred to make the electrode tip of platinum. In the interest of economy the amount of the metal used for the flange and other portions of the tip preferably will be kept at a minimum. However, less expensive heat resistant metals or alloys may be used if desired and the flange of the tip may be differently formed, as by being made heavier or preformed to conform to the curvature of the inner surface of the lower end 2a of the outer tube 2.

The wire 10 also preferably is made of platinum although less expensive heat resistant metals or alloys may be used instead. The attaching element 9 on the head of the tip may be omitted and the lower end of the wire 10 welded directly to the flange 8.

The structural arrangement just described positions the electrode tip properly at the lower end of the protective electrode body by the co-action of the inner and outer refractory tubes, the inner refractory tube by its weight alone clamping the flange of the tip in place in the bottom end of the outer refractory tube.

In use, the electrode may be suspended from vertically movable carrying means so as to depend through an opening C-1 in the top of a refractory-walled structure generally designated C to the surface of a molten glass body, indicated at 12, Fig. 1. The electrode body may extend through a heat insulating shield 13 which may be located on the top of the structure C so as to restrict upward passage of heat through the opening C-1 to the electrode carrying means.

The vertically movable electrode carrying means may be of any suitable known construction. In the example shown in Fig. 1, it comprises a holder, indicated generally at 14, for the upper end portion of the outer refractory tube 2. This holder comprises a nipple 15, an annular cap 16 screwed onto the lower end portion of the nipple 15, a suitable heat resistant packing 17 of asbestos cord or the like between the cap and the lower end of the nipple and compressed by these parts to frictionally engage the encircled portion of tube 2. A bushing 18 is threadedly engaged at 19 with the upper end portion of the nipple 15 and at 20 with the lower end of an elbow type junction box 21. A packing of asbestos rope or other suitable material is compressed as indicated at 22 between the bushing 18 and the upper end portion of the refractory tube 2. The frictional engagement of the packing rings 17 and 22 with the refractory tube 2 will retain the upper end portion of the suspended electrode in the holder 14 although other known means to accomplish this result may be employed if desired.

The elbow junction box 21 is threadedly connected at 23 with a horizontal tubular supporting member 24 which is shown only in part in Fig. 1. Member 24 may be supported and operated by any suitable known or preferred means, such, for example, as that disclosed in the aforesaid Patent No. 2,483,333, so as to give the desired vertical movements to the electrode. Junction box 21 has a removable cap 21a fastened thereto by conventional means, represented by the screw 25. A chamber 26 in such box is adapted for the reception of a block 27 of suitable insulating material which fits snugly therein. Set in this block is an electrically conductive connector strip 28. A vertical passage 29 is provided in the block from its bottom upwardly to a recess 28a of the electrically conductive strip 28. The upper end of the wire 10 may be inserted through this passage 29 into the recess 28a in electrically conductive strip 28 and clamped to the strip by a screw 30. Attached to the electrically conductive strip 28 in an exposed position above block 27 is a terminal screw 31 to which may be attached an end of a wire 32 extending through the horizontal supporting tube 24. This wire may lead to suitable electrical means (not shown) for passing current from a source through the wire 32, connecting strip 28, wire 10 and electrode tip 9—8—7 to the molten glass when the electrode tip has been lowered to the surface of such glass. A gasket 33 may be provided between the cap 21a and the elbow box 21 if desired.

If the refractory tubes are broken, they may be easily replaced. The repair can be effected simply by removing the electrode from its place of use, separating the components, removing the broken tubes and substituting new ones. This repair obviously can be made in the field at a relatively low cost. The wire 10 may have enough slack in it when clamped to the electric connector 28 to allow the flange 8 to conform to the inner surface of the lower end of the outer tube 2 under the influence of heat and the weight of the inner tube if the pressure of the latter alone is not sufficient to effect this result before the electrode is put into service.

I do not wish to be limited to the precise details of the illustrative novel electrode of the invention shown in the drawings and hereinbefore particularly described as changes therein and modifications thereof will readily occur to those skilled in the art.

I claim:

1. An electrode for contact with molten glass or like use comprising a refractory tube open at one end and having at its opposite end an end wall provided with an opening smaller in at least one transverse dimension than the corresponding dimension of the interior of the tube next to the end wall, an electrically conductive tip of heat resistant metal comprising a rod-like contact element extending through said opening in the end wall from the interior of the tube and projecting beyond said tube and a head portion on said contact element of greater transverse dimension than said transverse dimension of said opening and disposed within said tube against the inner surface of said end wall, a tip clamping member separate from and positioned within said refractory tube against said head portion of said tip to maintain said head portion pressed against the inner surface of said end wall and the rod-like element projecting from the opening in said end wall, said clamping member being removable from said refractory tube to permit disassembly of the tube and said tip, and an electrically conductive wire attached at one end to the head portion of said tip and extending through said tube for connection with a suitable source of electric current.

2. An electrode of the character described comprising an elongate body comprising an outer refractory tube having at one end an end wall provided with an axial opening and open at its opposite end, an inner refractory tube fitting in the outer tube with a moderate clearance to permit easy withdrawal of the inner tube from the outer tube when desired, an electrically conductive electrode tip comprising a head portion larger than the opening in said end wall of the outer tube and interposed between the inner surface of said end wall and the adjacent end of the inner tube so as to be clamped in place between these parts by the mere weight of the inner tube alone when the electrode body is positioned upright with the end wall of the outer tube lowermost, said tip including a smaller rod-like contact element projecting from said head portion axially thereof through said opening in said end wall of the outer tube beyond the latter and held in said position by the clamping of said head portion of the tip between the end wall of the outer tube and the adjacent end of the inner tube, and an electrically conductive wire attached at one end to said head portion of said tip and extending through said electrode body for attachment at its opposite end to a source of electric current supply.

3. An electrode as recited by claim 2 wherein said inner tube at its end next to the end wall of the outer tube also has an end wall provided with an opening aligned with the opening in the end wall of the outer tube, said electrode tip has a positioning and attaching projection on its head portion extending oppositely to the rod-like contact element through the opening in the end wall of the inner tube, and said wire is attached at its first named end to the terminal portion of said positioning and attaching projection and extends through said inner tube.

4. An electrode as recited by claim 3 wherein said end walls of said tubes are rounded or spherical in shape and said head portion of said tip is formed as an annular flat flange of conductive metal and sufficiently thin and flexible to be deformed by the weight of the inner tube pressing thereagainst when applied to conform to the contour of the clamping rounded or spherical end walls of said tubes.

5. An electrode as recited by claim 2 and, in addition, means including an electrically conductive connector strip positioned at the upper end of said electrode body and adapted for connection with a source of electric current, and a clamping screw releasably to attach the upper end of said wire to said connector strip.

AARON K. LYLE.

REFERENCES CITED

The following references are of record in the file of this patent:

UNITED STATES PATENTS

| Number | Name | Date |
| --- | --- | --- |
| 2,053,938 | Barker | Sept. 8, 1936 |
| 2,382,516 | Sprague | Aug. 14, 1945 |
| 2,501,787 | Rickmeyer | Mar. 28, 1950 |